United States Patent [19]

Deuring

[11] Patent Number: 4,667,967
[45] Date of Patent: May 26, 1987

[54] SHAFT SEALING SYSTEM WITH LIP AND LABYRINTH SEALS

[75] Inventor: Hans Deuring, Burscheid, Fed. Rep. of Germany

[73] Assignee: Goetze AG, Burscheid, Fed. Rep. of Germany

[21] Appl. No.: 915,127

[22] Filed: Oct. 3, 1986

[30] Foreign Application Priority Data

Oct. 4, 1985 [DE] Fed. Rep. of Germany ....... 3535445

[51] Int. Cl.⁴ .................. F16J 15/32; F16J 15/447
[52] U.S. Cl. ........................ 277/53; 277/24; 277/153
[58] Field of Search ............ 277/24, 53–57, 277/67–69, 152, 153

[56] References Cited

U.S. PATENT DOCUMENTS

| | | | |
|---|---|---|---|
| 2,994,571 | 8/1961 | Peras | 277/54 X |
| 3,459,431 | 8/1969 | Baker | 277/57 |
| 3,770,993 | 11/1973 | Schultenkamper | 277/53 X |
| 3,832,021 | 8/1974 | Jennings et al. | |
| 4,379,600 | 4/1983 | Muller | 277/56 X |
| 4,383,720 | 5/1983 | Ernst | 277/53 X |
| 4,384,387 | 5/1983 | Pachuta | 277/53 X |

FOREIGN PATENT DOCUMENTS 0117267 9/1984 European Pat. Off.
2041463 9/1980 United Kingdom .................. 277/56

*Primary Examiner*—Robert S. Ward
*Attorney, Agent, or Firm*—Spencer & Frank

[57] ABSTRACT

A shaft seal assembly adapted for installation on and concentrically with a rotary shaft for sealing off a chamber laden with a gas/liquid mixture from a space situated externally of the chamber. The assembly has a chamber side and an air side and further comprises a sealing lip circumferentially surrounding a stationary part of the assembly; a labyrinth sealing ring situated axially adjacent the sealing sleeve on the chamber side of the assembly. The labyrinth sealing ring comprises a rotary wall component and a stationary wall component together defining a labyrinth gap formed of a plurality of consecutive axial and radial passages for guiding the mixture in a path having a plurality of radial and axial deflections. The shaft seal assembly further has a liquid return device situated between the sealing lip and the labyrinth sealing ring as viewed along a path of propagation of the mixture in the assembly; and a radially oriented, operationally stationary return channel situated between the sealing lip and the labyrinth sealing ring for returning liquid from the assembly into the chamber in a radially outward direction.

7 Claims, 1 Drawing Figure

U.S. Patent May 26, 1987 4,667,967
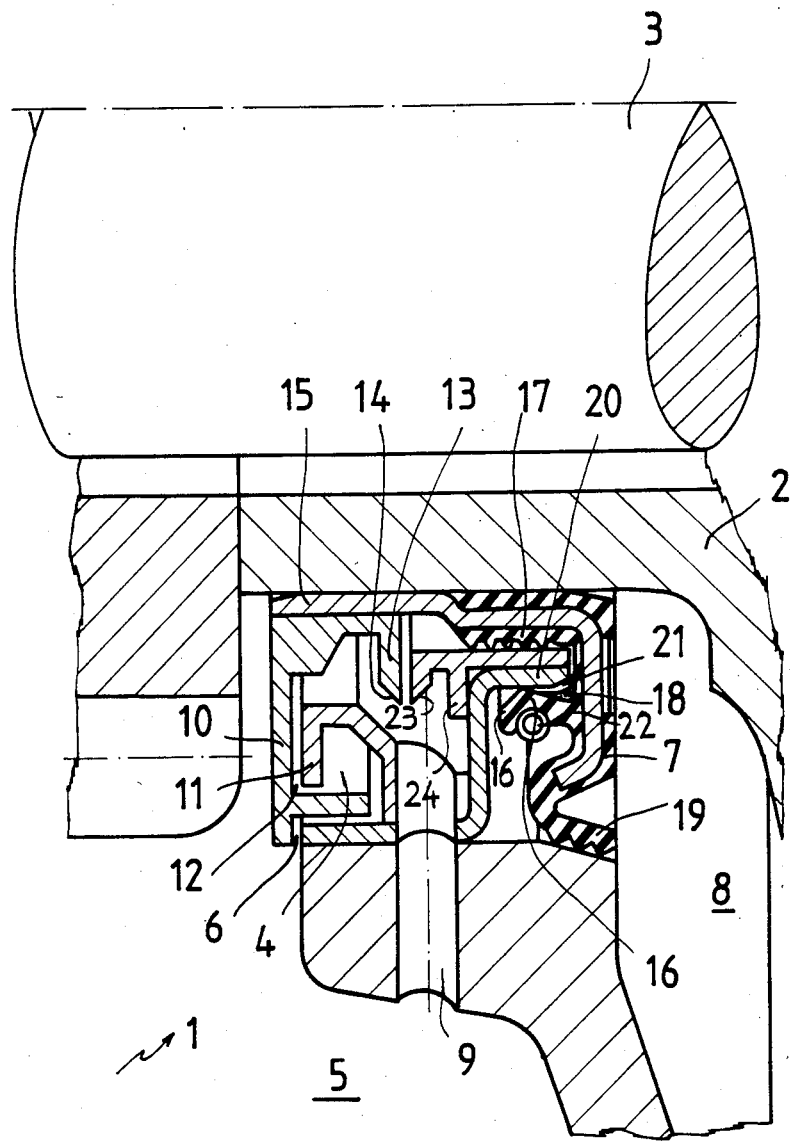

SHAFT SEALING SYSTEM WITH LIP AND LABYRINTH SEALS

BACKGROUND OF THE INVENTION

This invention relates to a sealing system for sealing a rotating shaft against leakage of gas/liquid mixtures such as air/oil mixtures contained in lubricating oil sprays in crankcases of internal combustion engines. The shaft seal system is of the type which has a revolving lip seal ring whose sealing lip, preferably under the effect of centrifugal forces, lifts off the shaft during revolution and a labyrinth sealing ring arranged on the gas/liquid side, adjacent the lip seal ring.

Elastomer lip seal rings are effectively used as shaft seal rings for sealing against leakage of liquids or gases which may be under different pressures. In case, however, gas/liquid mixtures such as air/oil mixtures are to be sealed, for example, in diesel engines, the dust and dirt particles entrained with the oil may deposit on the sealing lip and may cause damages and an eventual leakage of the fluid to be sealed. In particular, particles entrained by lubricating oil sprays may rapidly cause damages to the sealing lip, thus resulting in leakages, particularly where the crankshaft ends pass through the crankcase of a high-performance diesel engine in which the lubricating oil has a higher proportion of solid particles or the lubricating oil has a higher viscosity due to the combustion process. On the average, present-day crankshaft seals in diesel engines become inoperative frequently after a relatively short running period.

U.S. Pat. No. 3,459,431 discloses an elastomer lip seal ring for use in an oil-filled bearing. The lip seal ring has an axial elastomer projection at the air side protected by a metal ring which is bent approximately in a U-shaped manner over the projection without contacting the same and which rotates with the shaft. During operation, in the gap between the ring and the projection, dust, dirt, and vapor are deposited and thus the sealing lip proper is protected from damages or destruction. For crankshaft seals, however, such protective measures cannot be taken because the air/oil mixture forming a fluctuating oil spray would pass through the gap and the sealing lip and the dust and dirt particles collected in the gap would be entrained and carried to the sealing lips where they would cause damage.

In published European Patent Application No. 117,267, a shaft sealing system for drives lubricated by oil mist is disclosed. The sealing ring system comprises a rotary elastomer lip seal ring and an oil filter ring mounted on the oil mist side adjacent the lip seal ring. The sealing lip functions as a stationary shield only at standstill or at low rpm's while at higher rpm's the sealing lip lifts off the shaft due to centrifugal forces. In the oil filter ring itself at higher rpm's oil droplets are separated from the oil mist under the centrifugal forces and the oil droplets are guided back to the drive by means of radial channels provided in the housing. The sealing lip proper remains free from oil deposits and is thus protected against damages or destruction.

Such systems, however, are not adapted for sealing crankshaft ends in crankcases. Particularly in case of substantial impurities, such as oil carbon which results from the combustion in diesel engines and which finds its way into the crankcase, the fluctuating lubricating oil spray in the crankcase clogs the oil filter with the dirt particles in a short time or fine dirt particles are not filtered out of the lubricating oil at all. As a result, the oil filter becomes inoperative and the lubricating oil which contains the dirt particles could eventually find its way through the channels to the sealing lip, causing damages and leakages by deposits.

SUMMARY OF THE INVENTION

It is an object of the invention to provide an improved shaft sealing system against leakages of gas/liquid mixtures, particularly air/lubricating oil mixtures in the crankcase of a high-performance diesel engine, having an improved sealing effect, an increased operational safety against leakages and a significantly increased life expectancy. It is a further object of the invention to provide a sealing system which can be economically used in diesel engines manufactured in a production line.

This object and others to become apparent as the specification progresses, are accomplished by the invention, according to which, briefly stated, the labyrinth sealing ring comprises an operationally rotating and an operationally stationary part between which a gap is formed through which the gas/liquid mixture is guided with multiple radial and axial detours. Further, in the sealing lip part of the sealing lip a liquid returning device is arranged and is effective towards the gas/liquid side. Between the sealing lip part and the labyrinth part there is provided at least one liquid return channel which leads radially outwardly to a gas/liquid chamber.

A rotation in the labyrinth is imparted to the gas/liquid mixture penetrating into the labyrinth seal from the gas/liquid side while undergoing multiple detours, as a result of which there is obtained a separation of the liquid component - which occasionally may contain solid particles - by the effect of centrifugal forces. The droplets are collected on the axial projections at the outlet end of the labyrinth and are from that location returned to the liquid chamber in the radial return channel. In order to achieve an improved delivery of the separated liquid to the radially outwardly extending channel at the end of the labyrinth gap, the end of the labyrinth gap is preferably formed by a radially outwardly leading projection, whose end is chamfered to enhance a dripping or throwing of the liquid.

By virtue of the relatively significant width of the labyrinth gap and, above all, by virtue of the fact that the gap is bounded by the rotary and stationary walls, a clogging of the gap is not possible even in case the lubricating oil contains dirt particles or is of high viscosity. Consequently, the labyrinth seal remains fully effective also as a seal of the crankshaft ends in the crankcase of a high-performance diesel engine for long operational periods.

As noted earlier, a liquid return device is mounted adjacent the sealing lip proper which lifts off the "stationary" shaft in response to the centrifugal forces which appear when the idling rpm is exceeded. The liquid return device is formed of a screw thread configuration which cooperates with a stationary ring and which rotates during operation. According to an advantageous feature of the invention, the screw thread is formed in an elastomer material which, together with the sealing lip, is vulcanized to a rotating housing ring. The thread ribs cooperate preferably radially outwardly with the stationary ring and thus remain fully effective at high rpm's. By virtue of the liquid return device the substance of the fluctuating liquid spray which passes through the labyrinth seal and which is not entirely captured by the labyrinth seal, is returned and thus the sealing lip remains protected from the incoming liquids. For returning the liquid, the stationary ring, similarly to the end of the labyrinth seal, has a chamfered projection which is oriented radially outwardly towards the return channel and from which the accumulated liquid may drip into the channel.

In addition, to avoid a pumping effect of the sealing lip-carrying sealing sleeve during radial motions thereof, the space situated between the sealing sleeve and the stationary ring on the side of the liquid return device is designed to be as small as possible. Preferably, for this purpose the space is filled with a polymer foam such that only a small gap remains between the foam filling and the stationary ring or the sealing lip.

The invention thus provides a shaft sealing system for providing a seal against leakages of gas/liquid mixtures which is capable of operating for long periods without losses. In particular, an effective seal may be provided for long operational periods for lubricating oil/air mixtures in crankcases of high-performance diesel engines in which the lubricating oil has a relatively high proportion of solid combustion residues and/or has a relatively high viscosity. The relatively wide channel formed by the rotary and the stationary components in the labyrinth seal cannot be clogged and the sealing lip is protected from fluctuating, soiled oil sprays by means of additional measures. The structural embodiment provides at the same time a loss-free return and reusability of the lubricating oil.

Also, the seal according to the invention requires a small axial and radial structural space and is, before installing the shaft, assemblable in a centered manner with preset gaps making it particularly adapted for use as a sealing cartridge in the production line manufacture of internal combustion engines.

While the sealing systems according to the invention may find particularly advantageous application for sealing crankshaft ends in crankcases of high-performance diesel engines, they may be used in other environments having similar problems such as the sealing of oil mist-lubricated drive shafts or bearings.

BRIEF DESCRIPTION OF THE DRAWING

The sole FIGURE is an axial sectional view of a preferred embodiment of the invention.

DESCRIPTION OF THE PREFERRED EMBODIMENT

Turning to the FIGURE, the shaft sealing system generally designated at 1 is affixed to a rotary crankshaft 3 of a diesel engine by means of an intermediate ring 2. A labyrinth part 4 of the sealing system 1 has an opening 6 leading to a crankcase space 5 which is charged with oil mist. A sealing lip part 7 is situated on the air side 8. Between the labyrinth part 4 and the sealing lip part 7 there is situated a channel 9 extending radially outwardly to the crankcase space 5.

In the labyrinth part 4 there is formed a labyrinth gap 12 by an operationally rotating part 10 and an operationally stationary part 11 in which the oil mist is, while deflected several times radially and axially, separated by centrifugal forces and is removed from the axial projections and collected. The oil droplets are returned to the crankcase 5 either via the opening 6 or via the channel 9 into which they are admitted from the chamfered end 14 of a radial projection 13.

The lip seal part 7 is formed of a rotating housing ring 15 which is connected—via the ring 2—with the crankshaft 3 and to which there are vulcanized the spring biased, radially inwardly effective sealing lip 16 carried at the end of a sleeve part 16', the helical, radially outwardly effective liquid return device 17 and an air-side protective lip 19. The sealing lip 16 and the liquid return device 17 cooperate with the operationally stationary ring 20. The lubricating oil which finds its way in an extreme case up to the sealing lip part 7, is returned by the liquid return device 17 in the direction of the labyrinth part 4 and drips therefrom over the chamfered radial projection 23 of the stationary ring 20 for being returned in the channel 9. The second radial projection 24 of the ring 20 serves for centering and gap-setting during assembly of the sealing ring system 1 to form a ready-to-install sealing cartridge.

The housing ring 15, the part of the ring 20 within the sealing lip part 7 as well as the operationally stationary part 11 in the labyrinth part 4 are made of metal, while the ring 20 proper and the operationally rotary part 10 in the labyrinth part 4 are made of a synthetic material such as polyamide or polyvinyl chloride.

The space 18 between the sealing sleeve 16' urged radially inwardly by the circumferential spring 22 and the ring 20 is filled with a polymer foam material while maintaining a narrow gap 21 so that pumping effects by radial displacements of the sealing sleeve 16 essentially may not occur.

The present disclosure relates to subject matter contained in Federal Republic of Germany Patent Application No. P 35 35 445.3 (filed Oct. 4th, 1985) which is incorporated herein by reference.

It will be understood that the above description of the present invention is susceptible to various modifications, changes and adaptations, and the same are intended to be comprehended within the meaning and range of equivalents of the appended claims.

What is claimed is:

1. In a shaft seal assembly adapted for installation on and concentrically with a rotary shaft for sealing off a chamber laden with a gas/liquid mixture from a space situated externally of the chamber; the assembly having a chamber side and an air side and further comprising a sealing lip circumferentially surrounding a stationary part of the assembly; a labyrinth sealing ring situated axially adjacent said sealing sleeve on the chamber side of the assembly; the improvement wherein said labyrinth sealing ring comprises a rotary wall component and a stationary wall component together defining a labyrinth gap formed of a plurality of consecutive axial and radial passages for guiding the mixture in a path having a plurality of radial and axial deflections; further comprising a liquid return device situated between said sealing lip and said labyrinth sealing ring as viewed along a path of propagation of the mixture in said assembly; and means defining a radially oriented, operationally stationary return channel situated between said sealing lip and said labyrinth sealing ring for returning liquid from the assembly into the chamber in a radially outward direction.

2. A shaft seal assembly as defined in claim 1, further comprising a radial projection forming part of said rotary wall component and being oriented towards said return channel, said radial projection forming an end of said labyrinth gap.

3. A shaft seal assembly as defined in claim 2, wherein said radial projection has a chamfered terminus.

4. A shaft seal assembly as defined in claim 1, wherein said stationary part comprises a stationary ring; and further wherein said liquid return device has a rotary part having a screw-thread face being in a sliding engagement with said stationary ring and being situated adjacent said labyrinth sealing ring.

5. A shaft seal assembly as defined in claim 1, further comprising a housing ring arranged to surround the shaft and to rotate therewith; said liquid return device comprising an elastomer part; and a sealing sleeve having an end forming said sealing lip; said sealing sleeve and said elastomer part being bonded to said housing ring.

6. A shaft seal assembly as defined in claim 1, wherein said stationary part comprises a stationary ring having an end situated adjacent said labyrinth ring seal; said end of said stationary ring having a radial projection including a chamfered end.

7. A shaft seal assembly as defined in claim 1, further comprising a sealing sleeve having an end forming said sealing lip; a space defined together by said sealing sleeve and said stationary part; and a polymer filling contained in said space; said filling and said stationary part together defining a narrow clearance.

* * * * *